United States Patent
Uemura

(10) Patent No.: US 10,015,362 B2
(45) Date of Patent: Jul. 3, 2018

(54) IMAGE CAPTURING APPARATUS FOR RESIZING RAW IMAGE DATA AND CONTROL METHOD THEREOF

(71) Applicant: CANON KABUSHIKI KAISHA, Tokyo (JP)

(72) Inventor: Hidetaka Uemura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/704,412

(22) Filed: May 5, 2015

(65) Prior Publication Data
US 2015/0326794 A1    Nov. 12, 2015

(30) Foreign Application Priority Data

May 7, 2014  (JP) ................................. 2014-096221

(51) Int. Cl.
*H04N 5/262* (2006.01)
*H04N 5/76* (2006.01)
*H04N 1/393* (2006.01)
*H04N 5/232* (2006.01)
*H04N 1/407* (2006.01)
(Continued)

(52) U.S. Cl.
CPC ........... *H04N 1/393* (2013.01); *H04N 1/4076* (2013.01); *H04N 5/23296* (2013.01); *H04N 5/3454* (2013.01); *H04N 5/361* (2013.01)

(58) Field of Classification Search
CPC .. H04N 5/23296; H04N 5/3454; H04N 5/361; H04N 1/4076; H04N 1/393
See application file for complete search history.

(56) References Cited

U.S. PATENT DOCUMENTS

| 6,747,693 | B1 * | 6/2004 | Yamashita | ........... H04N 5/2628 348/208.12 |
| 2002/0044778 | A1 * | 4/2002 | Suzuki | .................. G06T 3/4015 396/429 |

(Continued)

FOREIGN PATENT DOCUMENTS

| CN | 101472075 A | 7/2009 |
| CN | 102403326 A | 4/2012 |

(Continued)

OTHER PUBLICATIONS

Nov. 16, 2017 Chinese Office Action, enclosed with an English Translation, that issued in Chinese Patent Application No. 201510225120.6.

(Continued)

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An image capturing apparatus comprises an image sensor in which pixels including a correction pixel region and an effective pixel region are arrayed two-dimensionally; and a creating unit configured to create uncompressed or losslessly-compressed image data from signals acquired from the effective pixel region and the correction pixel region, wherein in the case where a resizing process is to be carried out on the effective pixel region included in the image data, the creating unit does not carry out the resizing process on the correction pixel region.

15 Claims, 11 Drawing Sheets

(51) Int. Cl.
*H04N 5/345* (2011.01)
*H04N 5/361* (2011.01)

(56) References Cited

U.S. PATENT DOCUMENTS

| | | | | |
|---|---|---|---|---|
| 2004/0174444 | A1* | 9/2004 | Ishii | H04N 5/232 348/240.1 |
| 2006/0170786 | A1* | 8/2006 | Won | H04N 5/772 348/222.1 |
| 2006/0268158 | A1* | 11/2006 | Ishiyama | H04N 5/23203 348/373 |
| 2007/0139522 | A1* | 6/2007 | Konishi | A61B 1/045 348/71 |
| 2009/0122172 | A1* | 5/2009 | Iwata | H04N 5/2327 348/302 |
| 2012/0057055 | A1* | 3/2012 | Yokogawa | H01L 27/14621 348/273 |
| 2012/0194707 | A1* | 8/2012 | Koyama | H04N 5/772 348/240.1 |
| 2012/0229667 | A1* | 9/2012 | Tsunekawa | H04N 5/2628 348/222.1 |
| 2013/0188025 | A1* | 7/2013 | Hayashi | G03B 5/00 348/49 |
| 2014/0104459 | A1* | 4/2014 | Tanaka | H04N 5/23229 348/240.2 |
| 2014/0320692 | A1* | 10/2014 | Ichikawa | H04N 5/2621 348/223.1 |

FOREIGN PATENT DOCUMENTS

| | | |
|---|---|---|
| CN | 102625037 A | 8/2012 |
| JP | 2007-166551 A | 6/2007 |
| JP | 2009-147743 A | 7/2009 |
| JP | 2010-147765 A | 7/2010 |
| JP | 2011-139270 A | 7/2011 |
| JP | 2012-182748 A | 9/2012 |
| JP | 2013-118520 A | 6/2013 |
| JP | 2013-165394 A | 8/2013 |

OTHER PUBLICATIONS

The above foreign patent documents were cited in Apr. 6, 2018 Japanese Office Action, which is enclosed with an English Translation, that issued in Japanese Patent Application No. 2014096221.

* cited by examiner

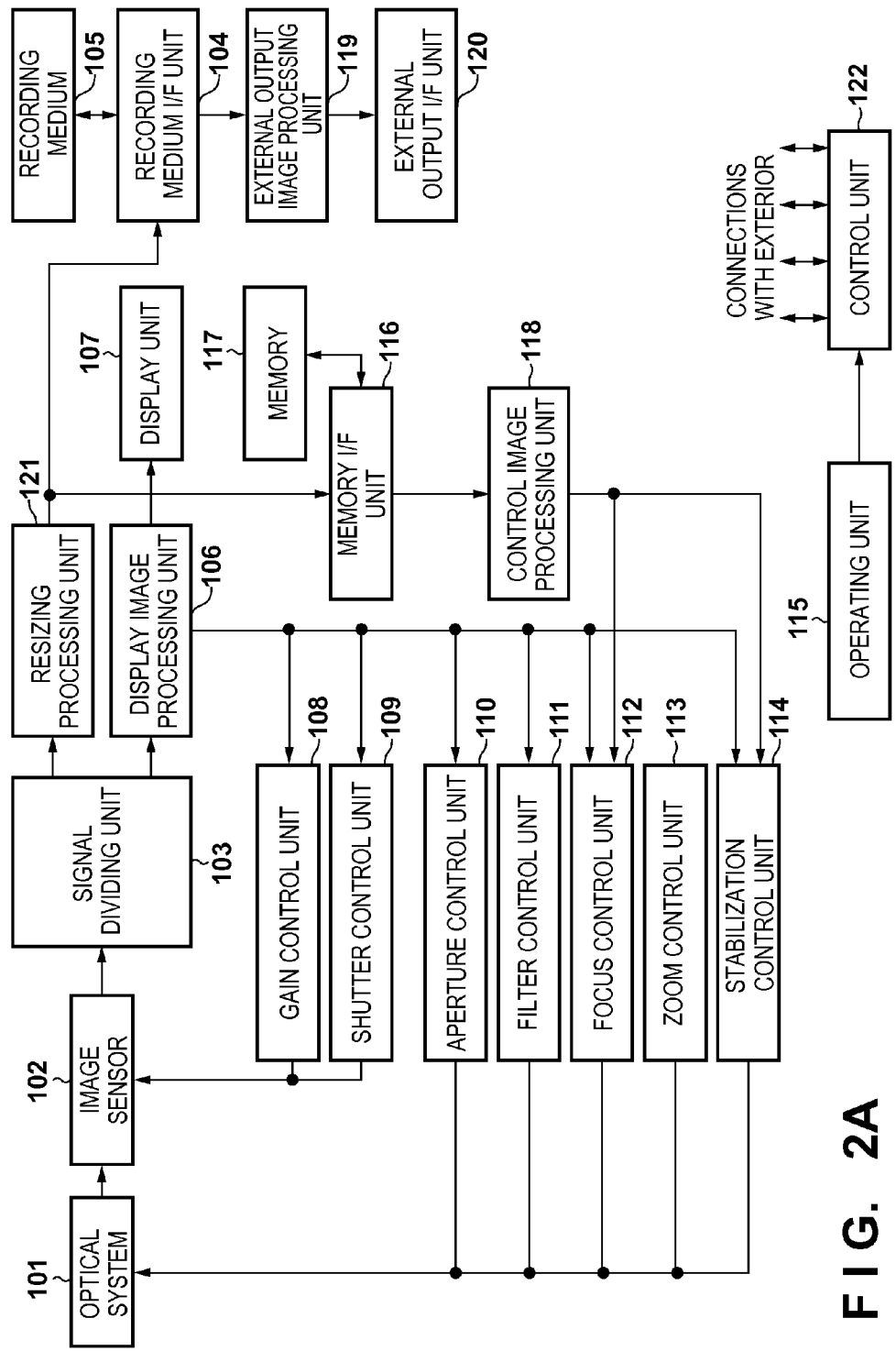
F I G. 2A

| Dummy | VOB 0 |
| Dummy | VOB 1 |
| Dummy | ⋮ |
| Dummy | VOB End |
| HOB 0 | EFFECTIVE PIXEL REGION 0 |
| HOB 1 | EFFECTIVE PIXEL REGION 1 |
| ⋮ | ⋮ |
| HOB End | EFFECTIVE PIXEL REGION End |

FIG. 5A

| VOB 0 | | | | |
|---|---|---|---|---|
| VOB 1 | | | | |
| ⋮ | | | | |
| VOB End | | | | |
| HOB 0 | HOB 1 | ⋯ | HOB n | EFFECTIVE PIXEL REGION 0 |
| HOB n+1 | EFFECTIVE PIXEL REGION 1 | | HOB n+2 | EFFECTIVE PIXEL REGION 2 |
| ⋮ | | | | |
| HOB n+m | EFFECTIVE PIXEL REGION m | | HOB n+m+1 | ⋯ | HOB End |

FIG. 5B

| VOB 0 | | | | | |
|---|---|---|---|---|---|
| VOB 1 | | | | | |
| ⋮ | | | | | |
| VOB End | | | | | |
| HOB 0 | HOB 1 | ⋯ | ⋯ | ⋯ | ⋯ |
| ⋯ | ⋯ | ⋯ | ⋯ | ⋯ | HOB End |
| EFFECTIVE PIXEL REGION 0 | | EFFECTIVE PIXEL REGION 1 | | ⋯ | |
| ⋯ | | ⋯ | | EFFECTIVE PIXEL End | |

IMAGE CAPTURING APPARATUS FOR RESIZING RAW IMAGE DATA AND CONTROL METHOD THEREOF

BACKGROUND OF THE INVENTION

Field of the Invention

The present invention relates to image capturing apparatus and control method thereof.

Description of the Related Art

Many image capturing apparatuses such as video cameras employ methods in which a video signal created by an image sensor is converted into digital data, the data is subjected to various types of signal processes and then encoded using a lossy compression technique, and the encoded data is recorded into a recording medium. However, some professional cameras, such as those used to film motion pictures, employ methods in which the video signal created by the image sensor is recorded after undergoing lossless compression or is recorded as image data in the RAW format, which is an uncompressed format (this will be called "RAW image data" hereinafter). This method enables a developing process in which a user can specify a variety of parameters to be carried out after the recording, so that the user can create a video aligned with his or her intentions.

When recording RAW image data, it is typical to use a technique in which developing parameters are also recorded as added information (metadata) and can then be used in the developing process. For example, a technique is known in which when performing a magnification process realized through digital zooming, a magnification rate is saved as metadata and the RAW image data is recorded as-is (Japanese Patent Laid-Open No. 2009-147743). Meanwhile, there is an increasing need to handle high-resolution video data such as 4K and ultra-high-definition formats, which tends to dramatically increase the size of the recorded RAW image data. In response to this, a technique is known in which data amounts are reduced by resizing images to sizes that are sufficient for the majority of users (Japanese Patent Laid-Open No. 2007-166551).

Incidentally, when recording RAW image data, the minimum required image correction is carried out, such as noise removal using pixels in an optical black region ("OB region" hereinafter) output from the image sensor, a clamping process (setting a black level), or correction for missing pixels. However, with the increase in processing amounts required by high-resolution video signals such as 4K and ultra-high-definition, it is desirable to suppress the amount of processing performed on the video signal and reduce the scale of the circuitry and so on in the image capturing apparatus by employing a configuration that carries out the minimum required image correction in the post-recording developing process as well.

It is necessary to record RAW image data including the OB region in order to realize a configuration in which the minimum required image correction is carried out in the post-recording developing process. However, how to handle the OB region data becomes an issue when carrying out resizing processes such as digital zooming, switching aspect ratios, dynamic extraction position changes caused by digital image stabilization, and so on. In particular, if the OB region is changed dynamically in response to dynamic switches in the angle of view due to digital zooming, dynamic changes in extraction positions due to digital image stabilization, and so on, major changes in image correction can be expected to occur from frame to frame, depending on the quality of the image sensor. Although the aforementioned Japanese Patent Laid-Open No. 2009-147743 and Japanese Patent Laid-Open No. 2007-disclose techniques for carrying out magnification processes on RAW image data, those documents do not disclose techniques for applying magnification processing to RAW image data that includes an OB region.

SUMMARY OF THE INVENTION

The present invention has been made in consideration of the aforementioned problems, and realizes an image capturing apparatus and a control method thereof capable of suppressing a drop in the quality of correction during developing that involves a resizing process, while also reducing an amount of processing involved in creating RAW image data.

In order to solve the aforementioned problems, the present invention provides an image capturing apparatus comprising: an image sensor in which pixels including a correction pixel region and an effective pixel region are arrayed two-dimensionally; and a creating unit configured to create uncompressed or losslessly-compressed image data from signals acquired from the effective pixel region and the correction pixel region, wherein in the case where a resizing process is to be carried out on the effective pixel region included in the image data, the creating unit does not carry out the resizing process on the correction pixel region.

In order to solve the aforementioned problems, the present invention provides a control method for an image capturing apparatus having an image sensor in which pixels including a correction pixel region and an effective pixel region are arrayed two-dimensionally, the control method comprising: a creating step of creating uncompressed or losslessly-compressed image data from signals acquired from the effective pixel region and the correction pixel region, wherein in the case where a resizing process is to be carried out on the effective pixel region included in the image data, the creating step does not carry out the resizing process on the correction pixel region.

According to the present invention, it is possible to suppress a drop in the quality of correction during developing that involves a resizing process, while also reducing an amount of processing involved in creating RAW image data.

Further features of the present invention will become apparent from the following description of exemplary embodiments (with reference to the attached drawings).

BRIEF DESCRIPTION OF THE DRAWINGS

FIGS. 2A and 2B are block diagrams illustrating an example of the functional configuration of the video camera according to an embodiment (FIG. 2A) and an internal configuration of a signal dividing unit (FIG. 2B).

FIGS. 5A and 5B are diagrams illustrating an example of a data array of RAW image data created by the resizing process according to the first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, descriptions will be given of an example in which the present invention is applied in a given video camera capable of recording each frame of a video signal in uncompressed or losslessly-compressed RAW format image data ("RAW image data" hereinafter) serving as an example of an image capturing apparatus. However, the present invention is not limited to video cameras, and can be applied in any electronic device capable of recording RAW image data. Such electronic devices can include cellular phones, gaming devices, tablet terminals, personal computers, and so on, for example.

In the present embodiment, a pixel in an optical black region ("OB region" hereinafter) is assumed to be a pixel used for correcting signals output from an image sensor when the sensor is in an optically shielded state. A "resizing process", meanwhile, refers to a process that selects some pixels out of the total number of pixels in temporarily-held image data and creates image data from the selected pixels in order to switch aspect ratios, change a zoom ratio through digital zooming, change an extraction position used for digital image stabilization, and so on.

Configuration of Video Camera 100

FIGS. 1A, 1B, 1C and 2A respectively illustrate an external view and a functional configuration of a video camera 100 serving as an example of an image capturing apparatus according to the present embodiment. Note that one or more of the functional blocks illustrated in FIG. 2A may be realized as hardware such as an ASIC or a programmable logic array (PLA), or may be realized as software executed by a programmable processor such as a CPU or an MPU. The functional blocks may also be realized as a combination of software and hardware. Accordingly, in the following descriptions, even when different functional blocks are indicated as being the primary elements carrying out operations, those functional blocks may be realized by the same instance of hardware.

Figure 1A:
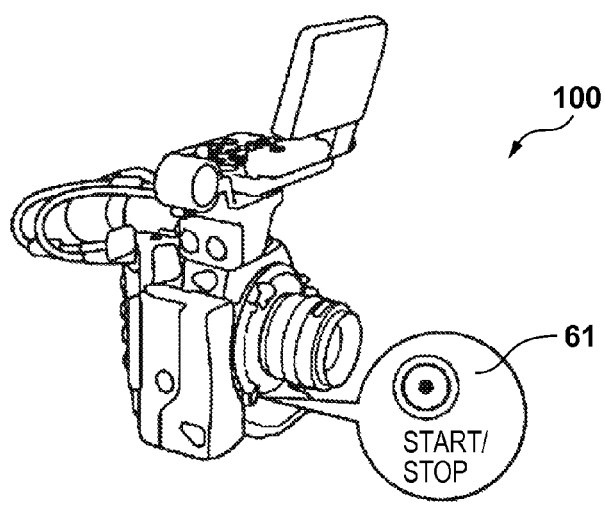
FIGS. 1A to 1C are external views of a video camera serving as an example of an image capturing apparatus embodying the present invention.
Figure 1B:
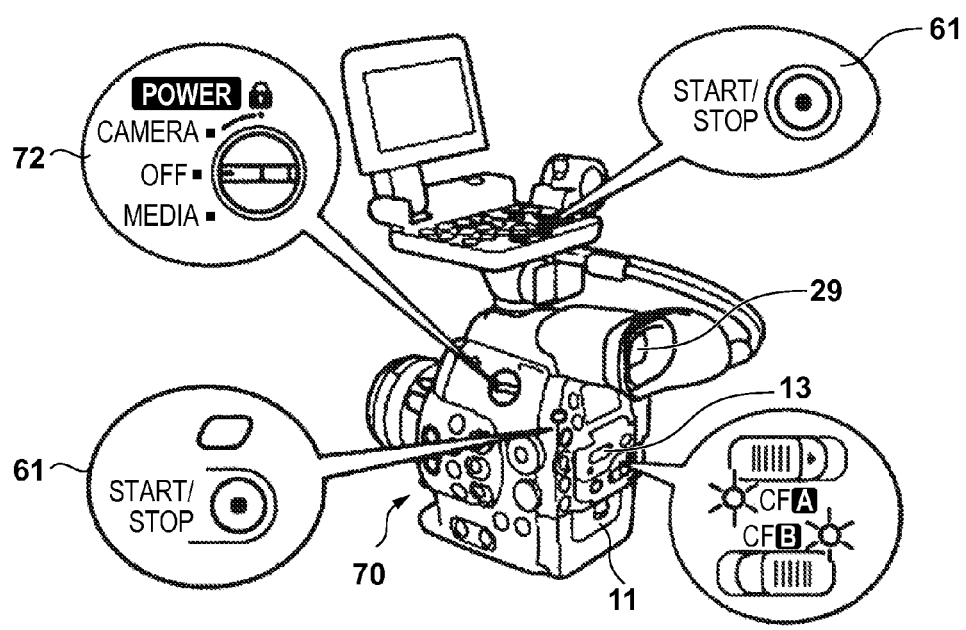
Figure 1C:
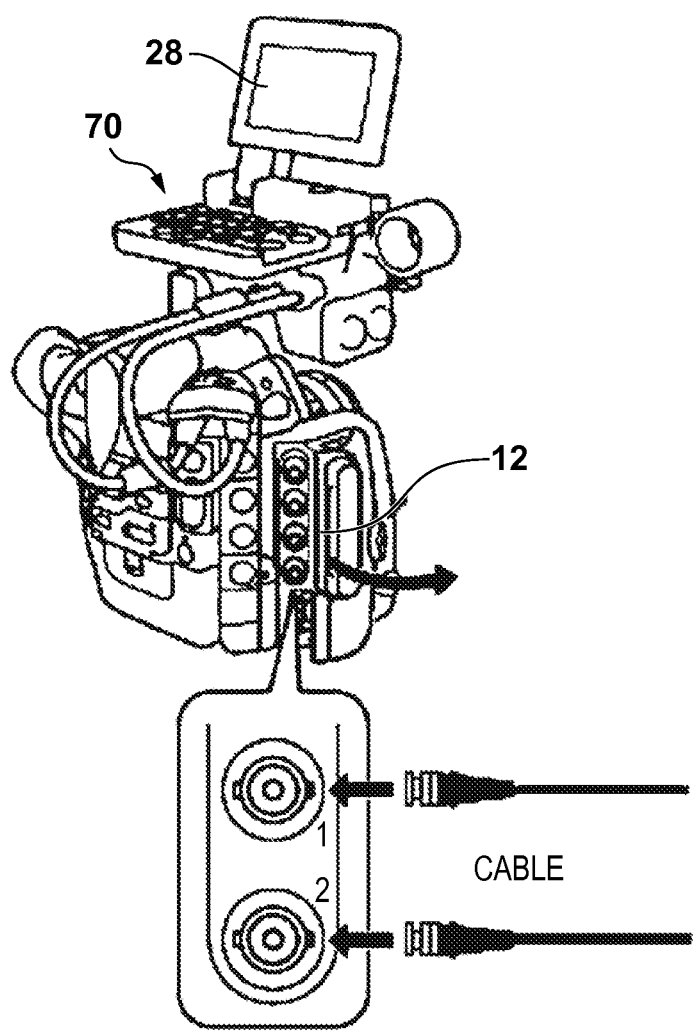

A monitor 28 and a viewfinder 29 illustrated in FIGS. 1B and 1C are included in a display unit 107, illustrated in FIG. 2A, that displays images, various types of information, and so on.

A trigger button 61 is an operating button for making a shooting instruction, whereas a power/mode switch 72 is an operating button for turning the power on and off, switching between a shooting mode and a playback mode, and so on, and like the trigger button 61, is included in an operating unit 115. An operating panel 70 is constituted of operating members such as various types of switches and buttons that accept various types of operations from a user, and is similarly included in the operating unit 115.

A connector 12 is a connector that outputs a video signal from the video camera 100 to an external monitor, an external recording apparatus, or the like, and constitutes an external output I/F 120. A battery cover 11 is a cover that holds a mounted battery.

An access lamp 13 is a lamp that indicates a state of a card slot used for recording, and is included in the display unit 107.

Next, the respective functional blocks will be described with reference to FIG. 2A.

An optical system 101 is a shooting lens constituted of a group of a plurality of lenses, and includes an aperture, a neutral density (ND) filter, and the like in addition to a focus lens, a zoom lens, and a shift lens.

An image sensor 102 has a configuration in which a plurality of pixels, each having a photoelectrical conversion element, are arrayed two-dimensionally. The image sensor 102 photo-electrically converts an optical image of an object formed by the optical system 101 on a pixel-by-pixel basis and furthermore carries out analog-digital conversion using an A/D conversion circuit, outputting an image signal (RAW image data) on a pixel-by-pixel basis. A CCD (Charge-Coupled Device) image sensor, a CMOS (Complementary Metal Oxide Semiconductor) image sensor, or the like can be employed as the image sensor 102. As will be described later, the pixels in the image sensor 102 from which signals are output include effective image region pixels that express signal strengths of the optical image of an object and OB region pixels used for correcting (noise removal, clamping, and so on) the signals output from the pixels in the image sensor.

A signal dividing unit 103 divides a digital signal, corresponding to the RAW image data from the image sensor 102, into two. One signal resulting from the division performed by the signal dividing unit 103 corresponds to RAW image data including all pixels, and this signal is output to a recording medium I/F unit 104 via a resizing processing unit 121. The other signal is RAW image data having a small data size, and is output to a display image processing unit 106.

The recording medium I/F unit 104 is an interface between a recording medium 105 and the video camera 100, and controls the recording of RAW image data input from the signal dividing unit 103 into the recording medium 105, the readout of recorded RAW image data from the recording medium 105, and so on.

The recording medium 105 is a recording medium constituted of a semiconductor memory or the like for recording video or image data that has been shot, and records RAW image data, reads out recorded RAW image data, and so on under the control of the recording medium I/F unit 104.

The display image processing unit 106 corrects level differences produced by the image sensor. For example, display image processing unit 106 uses the OB region pixels to correct the levels of the pixels in the effective region, carry out correction for missing pixels using peripheral pixels, and so on. The display image processing unit 106 also performs various types of processes such as correction for decreases in peripheral light amounts, color correction, edge enhancement, noise removal, gamma correction, de-Bayering, compression, and so on. After performing the stated processing on the RAW image data input from the signal dividing unit 103, the display image processing unit 106 outputs the corrected image data to the display unit 107, a gain control unit 108, other control units, and so on.

The display unit 107 is a monitor, a viewfinder, or the like that displays image data output from the display image processing unit 106 for confirming an angle of view. In addition to displaying various types of information of the video camera, the display unit 107 also indicates statuses using the access lamp 13.

The gain control unit 108, a shutter control unit 109, an aperture control unit 110, and a filter control unit 111, which will be described below, each refers to the image data output by the display image processing unit 106 and calculates a brightness level thereof.

The gain control unit 108 controls a gain of the image sensor 102 by calculating a gain value applied internally in the image sensor 102 based on the calculated brightness level. The shutter control unit 109 controls a shutter speed of the image sensor 102 by calculating a shutter speed value to be set in the image sensor 102 based on the calculated brightness level. The aperture control unit 110 controls the aperture of the optical system 101 by calculating an aperture value to be set in the optical system 101 based on the calculated brightness level. The filter control unit 111 controls an amount of light incident on the optical system 101 via an ND filter by calculating a neutral density (ND) filter value to be set in the optical system 101 based on the calculated brightness level, for example.

A focus control unit 112 calculates focusing information by referring to the image data output from the display image processing unit 106, and controls the focus lens in the optical system 101 based on the calculated focusing information.

A zoom control unit 113 controls the zoom lens in the optical system 101 based on focal length information input by the operating unit 115. A stabilization control unit 114 calculates a motion vector of an object by referring to the image data output from the display image processing unit 106, and carries out an optical image stabilization process that controls the shift lens in the optical system 101 so as to cancel out camera shake based on the calculated motion vector. Alternatively, the stabilization control unit 114 carries out an electronic image stabilization process that extracts an image in each frame of a moving picture in a direction that cancels out instability due to camera shake.

The operating unit 115 is constituted of the aforementioned trigger button 61, operating panel 70, and so on, and a user carries out various types of operations such as shooting instructions, aspect ratio switches, digital zooming, and so on, as well as focal length adjustment and the like, by making operation instructions through the operating unit 115. Upon receiving an operation instruction for switching the aspect ratio, adjusting the digital zoom, or the like, for example, the operating unit 115 communicates the instruction to a control unit 122.

A memory I/F unit 116 writes RAW image data for all of the pixels, output from the signal dividing unit 103, into a memory 117, and reads out RAW image data held in the memory 117 and outputs the data to a control image processing unit 118. The memory 117 is a volatile storage medium that holds the RAW image data of all of the pixels from several frames.

The control image processing unit 118 carries out image processes necessary for control on the RAW image data for all of the pixels sent from the memory I/F unit 116. The data corrected by the control image processing unit 118 is output to the focus control unit 112, the stabilization control unit 114, and so on.

An external output image processing unit 119 carries out image processes for external output on the RAW image data output from the recording medium I/F unit 104. The RAW image data output from the recording medium I/F unit 104 includes RAW image data read out via the recording medium I/F unit 104 and recorded into the recording medium 105. The external output image processing unit 119 creates corrected image data by carrying out a process for correcting the levels of pixels in the effective region using data of the OB region, a process for correcting missing pixels using peripheral pixels, and so on, for example. The external output image processing unit 119 also performs various types of processes such as peripheral light amount decrease correction, color correction, edge enhancement, noise removal, gamma correction, de-Bayering, compression, and so on.

The external output I/F 120 is an interface that outputs video data from the external output image processing unit 119 to the exterior. For example, the external output I/F 120 outputs corrected image data to an external display monitor, an external recording medium, or the like.

The resizing processing unit 121 temporarily holds RAW image data of all of the pixels, for pixel data sequentially output from the signal dividing unit 103, carries out a predetermined resizing process on the held pixel data, and outputs the RAW image data created as a result.

The control unit 122 includes a CPU, a ROM, a RAM, and so on, and the overall operation of the video camera 100 is controlled by the CPU loading programs stored in the ROM into a working area of the RAM and executing those programs. The control unit 122 implements the respective processes according to the present embodiment, mentioned later, by executing programs stored in the ROM. The RAM loads constants and variables for the control unit 122 to operate as well as programs and the like read out from the ROM. In addition, upon receiving an operation instruction for switching the aspect ratio, adjusting the digital zoom, or the like from the operating unit 115, the control unit 122 controls the resizing process performed by the resizing processing unit 121.

Figure 2B:
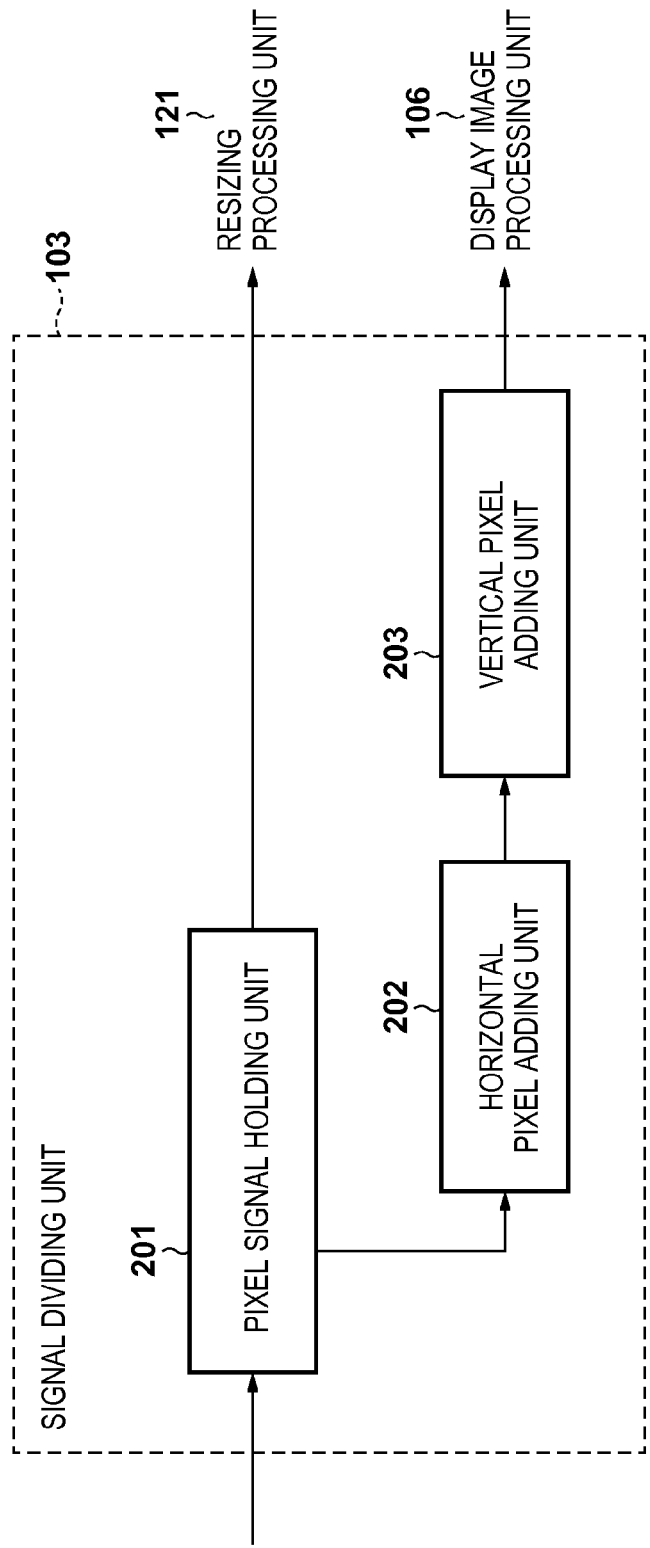

FIG. 2B illustrates the internal configuration of the signal dividing unit 103 in the video camera 100 according to the present embodiment. A pixel signal holding unit 201 temporarily holds, of the RAW image data output from the image sensor 102, several pixels' worth of data that has been sequentially output. The held data is input into a horizontal pixel adding unit 202 and the resizing processing unit 121, and the data output from the resizing processing unit 121 is input into the recording medium I/F unit 104, the memory I/F unit 116, and so on.

The horizontal pixel adding unit 202 creates one pixel's worth of data by adding four pixels' worth of data of the pixel data sent sequentially from the pixel signal holding unit 201. This reduces the number of horizontal pixels in the RAW image data to ¼. A vertical pixel adding unit 203 holds four lines' worth of the RAW image data input from the horizontal pixel adding unit 202 in an internal memory, adds four sequential pixels in the same column, and outputs the result to the display image processing unit 106. This reduces the number of vertical pixels in the RAW image data to ¼.

Configuration of RAW Image Data and Overview of Resizing Process

Figures 3A, 3B:
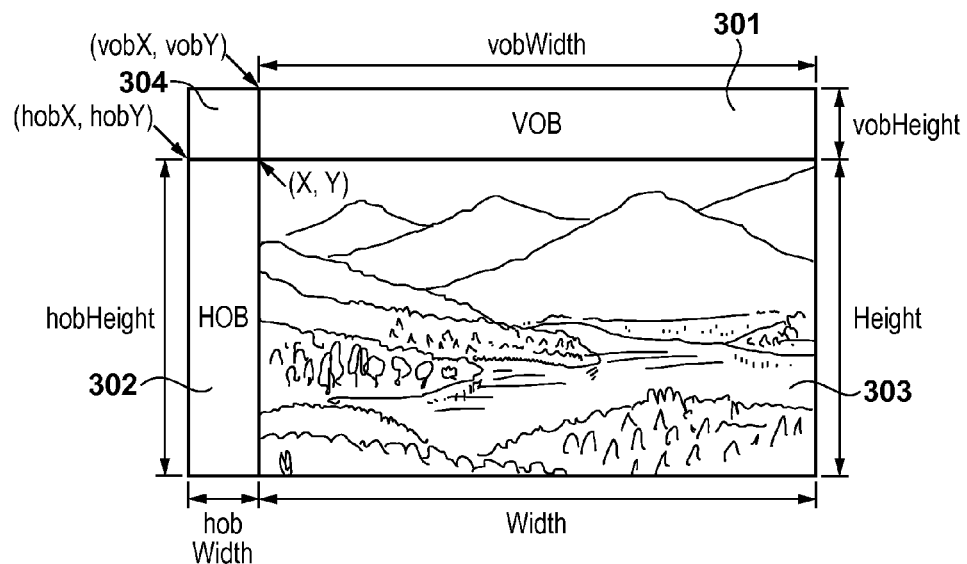
FIGS. 3A and 3B are diagrams schematically illustrating RAW image data having an OB region (FIG. 3A) and a diagram illustrating an example of a data array thereof (FIG. 3B).

Next, the configuration of RAW image data having the OB (optical black) region will be described with reference to FIGS. 3A and 3B. FIG. 3A is a diagram schematically illustrating the RAW image data. The RAW image data is constituted of pixel groups used for correction, namely a vertical optical black (VOB) region 301 and a horizontal optical black (HOB) region 302, and pixel groups including an effective pixel region 303 and a region 304 (an OB region not used for image correction during development). Upper-left address information (x,y), a vertical size (Height), and a horizontal size (Width) of each region are recorded in metadata attached to each piece of RAW image data. The RAW image data can be divided into these respective regions using this metadata when loading and developing the RAW image data, and noise removal, clamping, and so on using the pixels in the OB region can thus be executed during development.

FIG. 3B schematically illustrates a data array in the RAW image data. One horizontal line's worth of data is arranged sequentially on a pixel-by-pixel basis, and several vertical line's worth of those lines is furthermore arranged. The data amount is equivalent to (HOB region horizontal size (hob-Width)+effective pixel region horizontal size (Width))× (VOB region vertical size (vobHeight)+effective pixel region vertical size (Height))×1 pixel.

An example of the resizing process carried out on such RAW image data will be described with reference to FIGS. 4A to 5B. The present embodiment describes an example in which the data amount of the RAW image data is reduced without reducing the image correction quality during development by carrying out the resizing process only on the effective pixel region 303, without carrying out the resizing process on the OB region (that is, the VOB region 301 and the HOB region 302).

RAW image data to which the resizing process according to the present embodiment has been applied will be described with reference to FIGS. 4A and 4B.

Figure 4A:
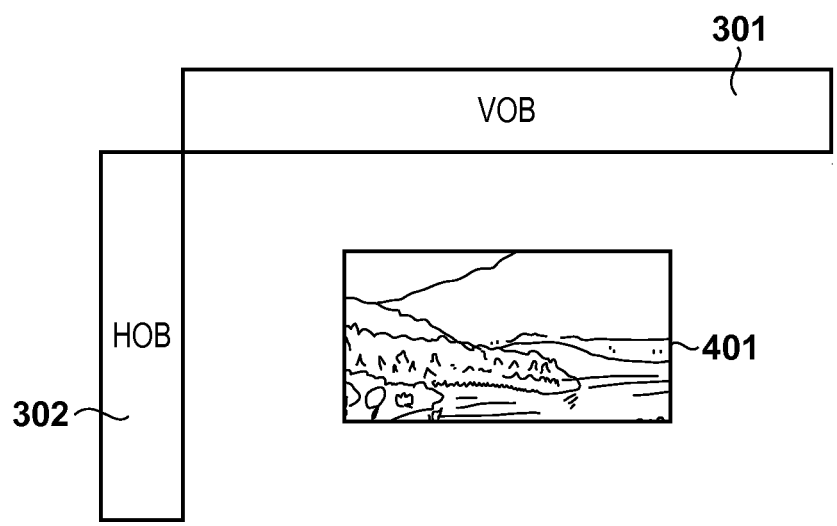
FIGS. 4A and 4B are diagrams schematically illustrating RAW image data created by a resizing process according to a first embodiment.
Figure 4B:
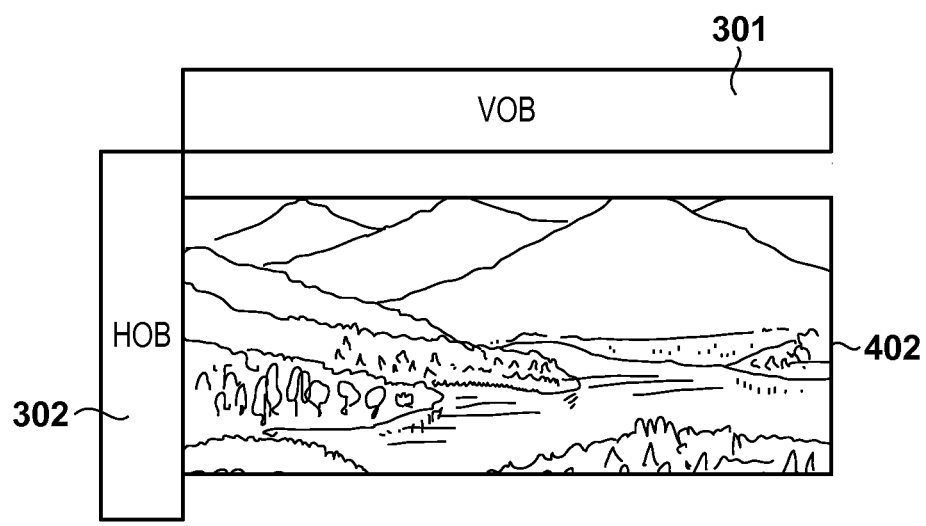

FIG. 4A schematically illustrates RAW image data created by the resizing process performed by the resizing processing unit 121 when digital zooming is carried out on the image illustrated in FIG. 3A. In this example, the resizing processing unit 121 creates an effective pixel region 401 by carrying out the resizing process based on a digital zoom ratio only on the effective pixel region 303, without carrying out the resizing process on the VOB region 301 and the HOB region 302. Meanwhile, FIG. 4B schematically illustrates RAW image data created by the resizing process when the aspect ratio has been switched in the image illustrated in FIG. 3A. As in FIG. 4A, the resizing processing unit 121 creates an effective pixel region 402 by carrying out the resizing process based on the aspect ratio only on the effective pixel region 303, without carrying out the resizing process on the VOB region 301 and the HOB region 302.

Because the data amount is reduced by carrying out the resizing process only on the effective pixel region 303, it is necessary for the post-resizing data array to take on a different format than the data array of the RAW image data illustrated in FIG. 3B. Accordingly, two data array examples according to the present embodiment will be described with reference to FIGS. 5A and 5B. However, the data array is not limited to these examples as long as the data array includes the data of the VOB region 301 and the HOB region 302 that has not undergone the resizing process and the data of the effective pixel region that has undergone the resizing process.

FIG. 5A is an example of a data array to which has been applied a format as close as possible to the format illustrated in FIG. 3A. Specifically, part of the effective pixel region 303 rendered unnecessary by the resizing process and the data of the OB region 304 not used in the image correction during development is deleted from the data array illustrated in FIG. 3A. The resizing processing unit 121 arranges the pixel data at an address (vobX, vobY) at a left end of the VOB region at a vertical address 0 (a first line) at the start of the data, and arranges one horizontal line's worth of data sequentially thereafter. The data of the VOB region at a vertical address 1 (a second line) is arranged next. The HOB region and effective pixel region data is arranged in the lines after the VOB region arrangement finishes. In the case where the vertical size (Height) of the effective pixel region has been reduced to m lines' worth by the resizing process, the resizing processing unit 121 first arranges the HOB regions (HOB1 to HOBn−1) that do not correspond to the respective lines of the effective pixel region. Then, the data is arranged so that combinations of corresponding HOB regions and effective pixel regions (for example, HOBn and effective pixel region 0) are filled, and when the combination for the effective pixel region m finishes being arranged, the remaining HOB region is arranged. Note that dummy pixels may be inserted as appropriate in order to adjust the arrangement of the HOB region and the effective pixel region with respect to the width of the VOB region (vobWidth). Arranging the data in such a data array has an advantage in that circuits, software modules, and so on that normally carry out correction processing using an OB region can also be used as circuits, software modules, and so on that carry out the developing process on the created RAW image data.

FIG. 5B illustrates an example in which a data array is formed through splitting into regions, unlike the data array for the RAW image data illustrated in FIG. 3B. The resizing processing unit 121 first arranges all of the data in the VOB region. This point is the same as the data array illustrated in FIG. 5A. Next, the resizing processing unit 121 arranges the data by region, for the HOB region and the effective pixel region as well. The data for one region, for example the HOB region, is arranged up to the final line, and then the data for the other region, for example the effective pixel region, is arranged. Only the HOB region being continuously arranged up to the final line differs from the data array of the RAW image data illustrated in FIGS. 3B, 5A, and so on. By arranging the data in such a data array, the data array is simplified, it is easier to obtain the data from the respective regions, and the processing is accelerated.

Series of Operations in Resizing Process

Next, a series of operations included in the resizing process will be described with reference to FIG. 6.

This processing is started in the case where an instruction to execute the resizing process has been made by the control unit 122 in a state where shooting has been started and the pixels of RAW image data output from the image sensor 102 via the signal dividing unit 103 have been input into the resizing processing unit 121. This processing controls the resizing processing unit 121 as a result of a program stored in the ROM being loaded into a working area of the RAM and executed by the control unit 122.

In S601, the resizing processing unit 121 determines, for the RAW image data input via the signal dividing unit 103, whether pixels of the RAW image data that constitute an image have been loaded. The process moves to S602 in the case where it is determined that all of the pixels have been loaded and the RAW image data has been successfully acquired, whereas the process returns to S601 and stands by until the loading is complete in the case where it is determined that all of the pixels have not been loaded.

In S602, the resizing processing unit 121 specifies a region that is to be an effective region following the resizing process, for each of the regions, namely the effective pixel region, the HOB region, and so on. That is, upon receiving the input of an operation from the operating unit 115, a resizing request for digital image stabilization, or the like (a request to change an angle of view, an extraction position, or the like), the control unit 122 calculates, for each region, a post resizing process upper-left coordinate, vertical size, and horizontal size from the content of the resizing request. Accordingly, the resizing processing unit 121 acquires the calculated upper-left coordinate, the vertical size, and the horizontal size of each region, and specifies the regions that are to be effective regions following the resizing process, for each region. In the present embodiment, the region that is effective in the effective pixel region 303 changes due to the resizing process, but the region that is effective in the VOB region 301 and the HOB region 302 does not change.

In S603, the resizing processing unit 121 carries out a looped process for each pixel in the RAW image data. The looped process is repeated the same number of times as there are pixels in the RAW image data. The looped process is started from the upper-left pixel in the RAW image data, proceeds in order to pixels to the right thereof, and starts again from the next line when a single line's worth of pixels has been processed. In S603, upon the processing returning from S606, the resizing processing unit 121 determines whether the processing has been completed the same number of times as there are pixels in the RAW image data; the process moves to S607 in the case where it is determined that this processing has been completed, and moves to S604 in the case where it is determined that this processing has not been completed.

In S604, the resizing processing unit 121 determines whether a pixel to be processed is in a post-resizing process region, and selects pixels to be used in the creation of the RAW image data. The resizing processing unit 121 first specifies which of the effective pixel region 303, the VOB region 301, and so on the pixel to be processed belongs to based on the coordinate position of the pixel to be processed, and determines whether the pixel to be processed is within the post-resizing process region based on the information specified in S602. For example, in the case where the pixel to be processed is a pixel in the effective pixel region 303, the resizing processing unit 121 determines whether that pixel is in the post-resizing process effective pixel region 401. When the pixel to be processed is a pixel in the VOB region 301 or the HOB region 302, the resizing processing unit 121 determines whether that pixel is in a corresponding post-resizing process region. In the present embodiment, when the pixel to be processed is a pixel in the VOB region 301 or the HOB region 302, that pixel is in the post-resizing process region. In the case where the resizing processing unit 121 determines that the pixel to be processed is in the post-resizing process region, the process moves to S605, whereas in the case where the pixel to be processed is not in the post-resizing process region, the process moves to S606.

In S605, the resizing processing unit 121 arranges the selected pixel to be processed, that has been determined to be in the post-resizing process region, in the resized RAW image data.

In S606, the resizing processing unit 121 returns the processing to S603 and executes the looped process again.

In S607, the resizing processing unit 121 outputs the post-resizing process RAW image data in which the pixels have been arranged through the stated processing, and the series of processes is completed.

By carrying out the resizing process on the RAW image data in this manner, the pixels can be arranged in the RAW image data array illustrated in FIG. 5A. Note that the RAW image data array illustrated in FIG. 5B can be created by executing the processes of S603 to S606 for each region, or the respective pixels may be arranged by rearranging the RAW image data output as a result of the stated series of processes.

As described thus far, according to the present embodiment, when performing the resizing process on the RAW image data, the resizing process is carried out on the effective pixel region, and all of the pixels in the OB region are left in the created RAW image data. By doing so, image correction such as clamping that uses the pixels of the OB region output from the image sensor can also be carried out in the apparatus that plays back the RAW image data, making it possible to reduce the circuit scale in the image capturing apparatus, reduce the amount of power consumed, suppress a rise in the temperature of the apparatus main body, and so on. Furthermore, by including the entire OB region in the RAW image data, the correction processing in the apparatus that plays back the RAW image data can be stabilized without the OB region pixels necessary for the stated correction being eliminated by the resizing process. To rephrase, the stated configuration makes it possible to suppress a drop in the correction quality during development involved in the resizing process while reducing the amount of processing involved in creating the RAW image data.

Second Embodiment

Next, a second embodiment will be described. In the resizing process according to the first embodiment, the resizing processing unit 121 leaves all of the pixels in the OB region of the RAW image data; however, in a resizing process according to the second embodiment, the OB region is eliminated in the resizing process performed on the effective pixel region. The processing is the same aside from processes that control settings for the resizing process, and the functional configuration of the video camera 100 according to the present embodiment is the same as in the first embodiment; as such, redundant descriptions will be omitted and focus will be placed on the different points.

Figure 7A:
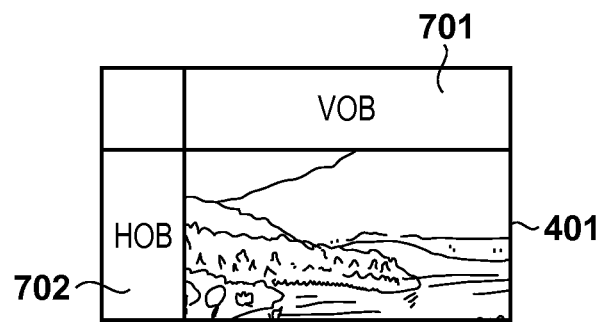
FIGS. 7A and 7B are diagrams schematically illustrating RAW image data created by a resizing process according to a second embodiment.

RAW image data according to the present embodiment will be described with reference to FIGS. 7A and 7B. FIG. 7A schematically illustrates RAW image data created by carrying out a resizing process through digital zooming on the image illustrated in FIG. 3A. In this example, the resizing process is carried out on both the horizontal and vertical lines in the effective pixel region, whereas the resizing process is carried out only in the horizontal direction in the VOB region and only in the vertical direction in the HOB region. As a result, the pre-resizing process VOB region 301 and HOB region 302 become a VOB region 701 and an HOB region 702, respectively. This reduces the data amount in the created RAW image data while leaving the VOB region and the HOB region corresponding to the effective pixel region after the resizing process has been carried out.

Figure 7B:
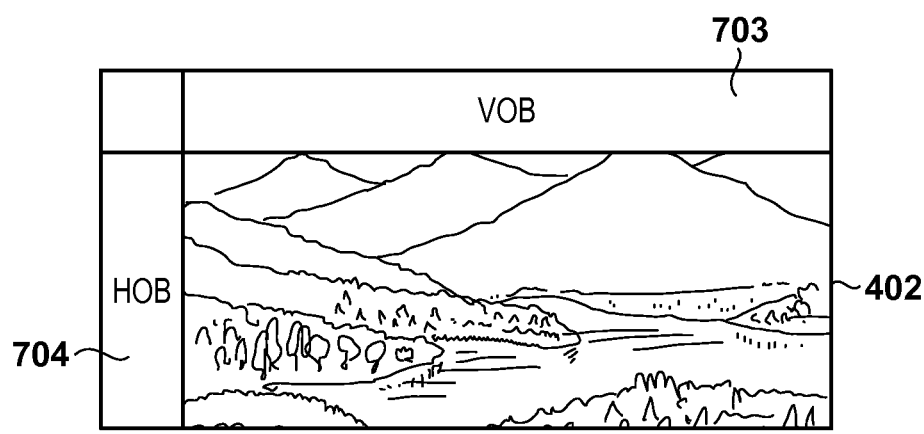

FIG. 7B schematically illustrates RAW image data created by carrying out a resizing process through switching the aspect ratio of the image illustrated in FIG. 3A. In this example, the resizing process is carried out in the vertical direction in the effective pixel region, and the horizontal size (Width) of the effective pixel region is not changed. Accordingly, the resizing process is carried out only in the vertical direction in the HOB region, and the VOB region is not reduced in size. The data amount in the created RAW image data is reduced through such processing.

In the present embodiment, the RAW image data is created by carrying out the resizing process on the OB region so as to correspond to the effective pixel region, and thus the data array can be given the same format as the data array of the RAW image data illustrated in FIG. 3B. However, the region 304, which is not needed in the image correction during development as per the format illustrated in FIGS. 5A and 5B and described in the first embodiment, may be eliminated in order to further reduce the data amount. Note that the resizing process is carried out only in the horizontal direction for the VOB region and only in the vertical direction for the HOB region in order to avoid a reduction in the amount of information of the OB region used in noise removal, clamping, and so on during development.

A series of operations in the resizing process according to the present embodiment will be described with reference to the flowchart in FIG. 8. This processing is started in the case where a user has made an operation instruction to the operating unit 115 in a state where shooting has been started and the pixels of RAW image data output from the image sensor 102 via the signal dividing unit 103 have been input into the resizing processing unit 121. This processing is realized by a program stored in the ROM being loaded into a working area of the RAM and executed by the control unit 122.

In S801, the control unit 122 inputs the operation instruction communicated from the operating unit 115, and determines whether the input operation instruction is a resizing request. The control unit 122 moves the processing to S802 in the case where it is determined that the operation instruction is a resizing request, and returns the processing to S801 and stands by for a resizing request instruction in the case where it is determined that the operation instruction is not a resizing request.

In S802, the control unit 122 determines whether the resizing request from the user operation includes resizing in the vertical direction (vertical resizing). In the case where the control unit 122 has determined that the resizing request communicated from the stated operation content includes vertical resizing, the process moves to S803, whereas in the case where it is determined that the resizing request does not include vertical resizing, the process moves to S804.

In S803, the control unit 122 sets region information for a vertical resizing process in order to carry out the resizing process on the HOB region. Specifically, an upper-left coordinate (x,y), a vertical size (hobHeight), and a horizontal size (hobWidth) are calculated for the post-resizing process HOB region and stored in the RAM. The information recorded in the RAM is later read out and input into the resizing processing unit 121 and used in S602 of the resizing process.

In S804, the control unit 122 determines whether the resizing request from the user operation includes resizing in the horizontal direction (horizontal resizing). In the case where the control unit 122 has determined that the resizing request communicated from the stated operation content includes horizontal resizing, the process moves to S805, whereas in the case where it is determined that the resizing request does not include horizontal resizing, the process moves to S806.

In S805, the control unit 122 sets region information for a horizontal resizing process in order to carry out the horizontal resizing process on the VOB region. Specifically, an upper-left coordinate (x,y), a vertical size (vobHeight), and a horizontal size (vobWidth) are calculated for the post-resizing process VOB region and stored in the RAM.

In S806, the control unit 122 sets region information for the effective pixel region in order to carry out the resizing process on the effective pixel region. Specifically, an upper-left coordinate (x,y), a vertical size (Height), and a horizontal size (Width) are calculated for the post-resizing process effective pixel region and stored in the RAM.

Figure 6:
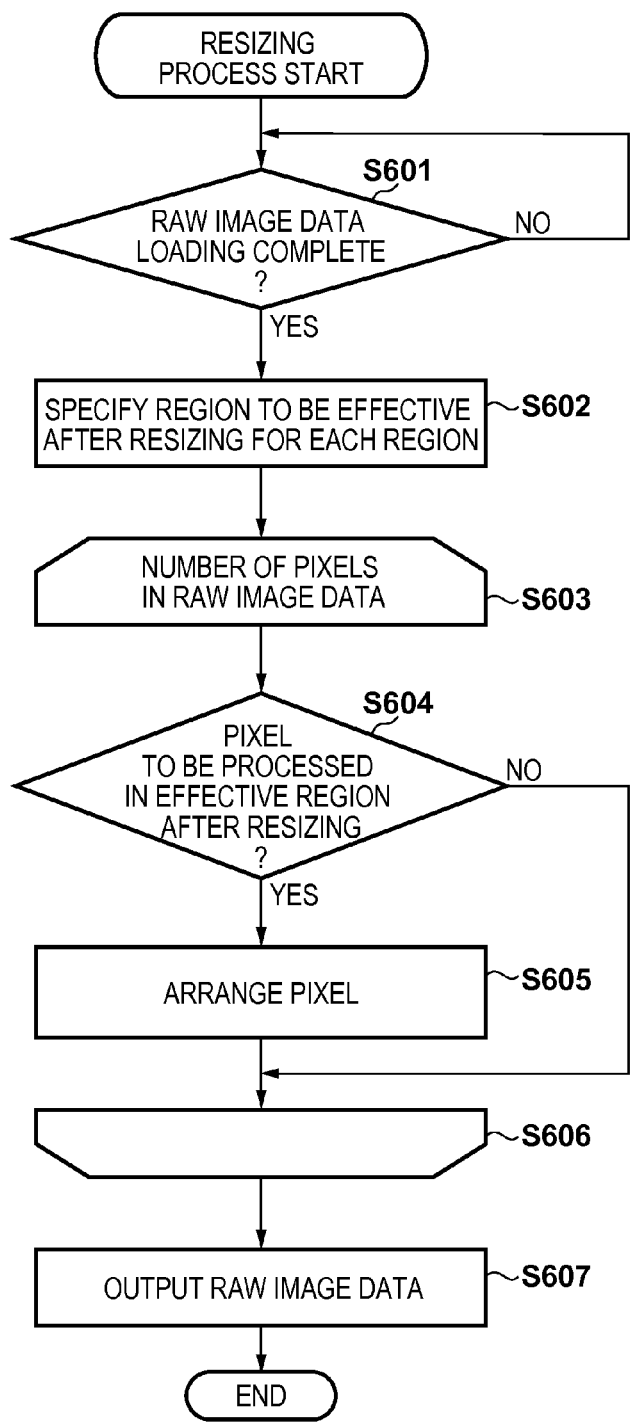
FIG. 6 is a flowchart illustrating a series of operations in the resizing process according to the first embodiment.

In S807, the resizing processing unit 121 executes the resizing process illustrated in FIG. 6 based on the information set in each step in response to instructions from the control unit 122. The control unit 122 reads out the region information stored in the RAM and inputs the information into the resizing processing unit 121. When the resizing process is completed by the resizing processing unit 121, the control unit 122 ends the series of processes according to the present embodiment.

Although the present embodiment describes the resizing request as being communicated from the operating unit 115, the resizing request may be communicated by the stabilization control unit 114 for stabilization processing or from the control unit 122 itself, regardless of user operations.

As described above, in the present embodiment, the resizing process is carried out in the horizontal direction for the VOB region and in the vertical direction for the HOB region in the OB region as well, in the case where the resizing process is carried out on the effective pixel region. By doing so, a drop in the correction quality during development involved in the resizing process can be suppressed while reducing the amount of processing involved in the creation of the RAW image data, and furthermore, the data amount of the created RAW image data can be reduced as well.

Third Embodiment

Next, a third embodiment will be described. In the third embodiment, a resizing process carried out on the OB region is controlled in accordance with the details of a resizing request, for example, in the case where the content of the resizing request is an aspect ratio switch. The processing is the same aside from processes that control settings for the resizing process, and the functional configuration of the video camera 100 according to the present embodiment is the same as in the first embodiment; as such, redundant descriptions will be omitted and focus will be placed on the different points.

Figure 8:
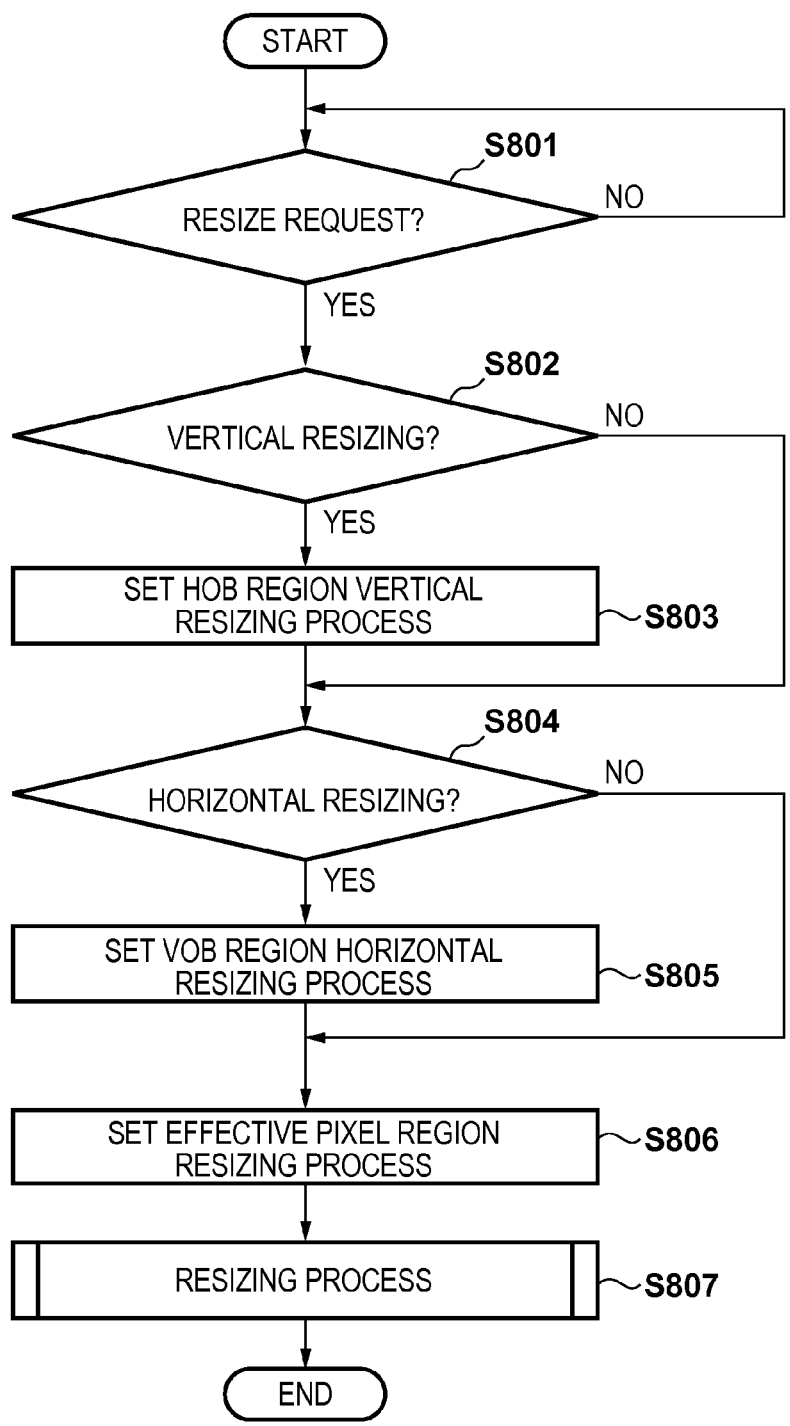
FIG. 8 is a flowchart illustrating a series of operations in the resizing process according to the second embodiment.
Figure 9:
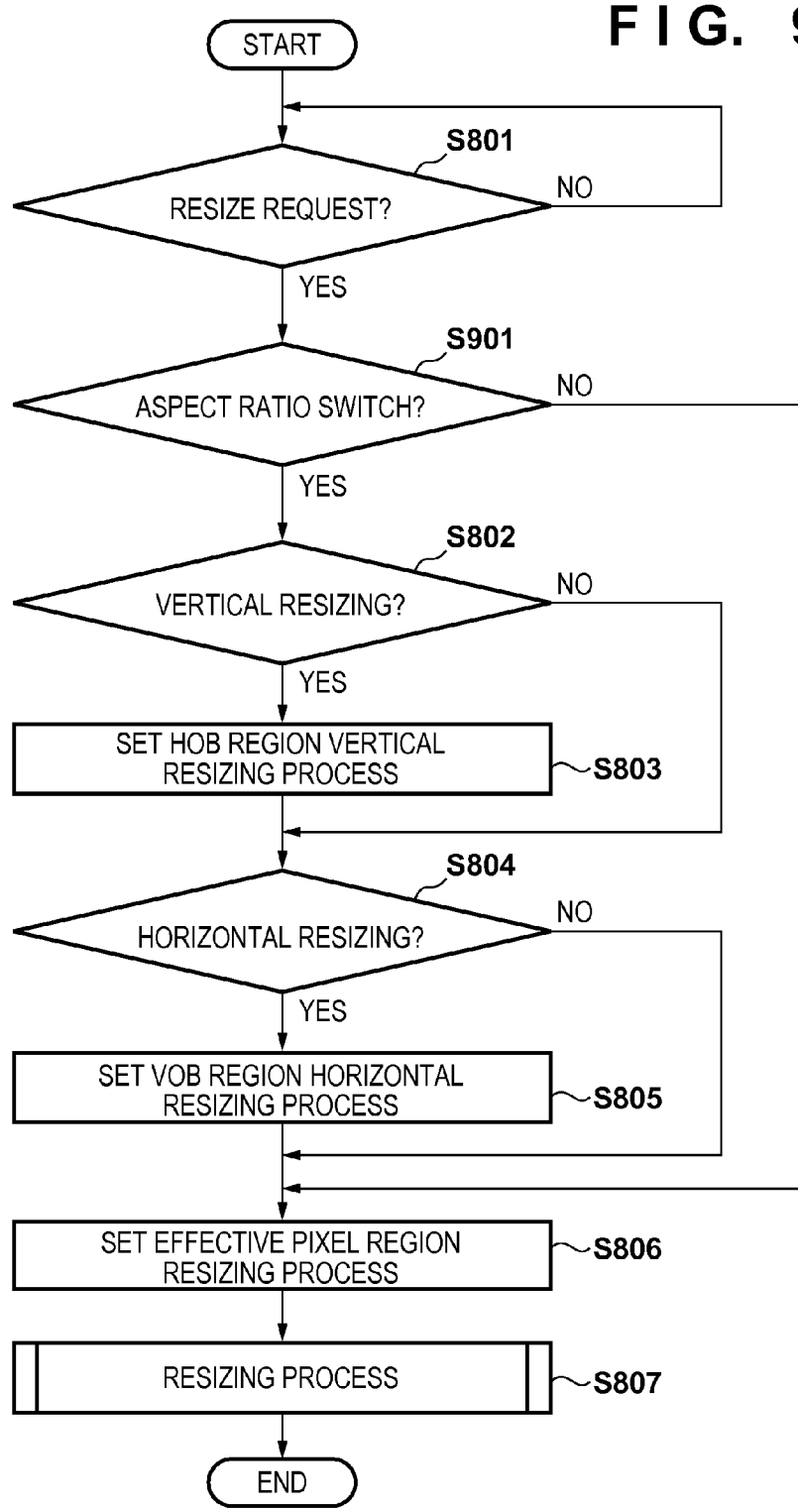
FIG. 9 is a flowchart illustrating a series of operations in a resizing process according to a third embodiment.

FIG. 9 illustrates a resizing process according to the present embodiment, and the difference from the processing illustrated in FIG. 8 is the processing performed by the control unit 122 in S901.

In S901, the control unit 122 determines whether the operation content of the resizing request is an aspect ratio switch. In the case where the operation content is an aspect ratio switch, the control unit 122 moves to the processing of S802 and on in order to carry out the resizing process on the OB region, and when it is determined that the operation content is not an aspect ratio switch, the resizing process is carried out only on the effective pixel region in S806. However, the resizing process is not necessarily carried out on the OB region only in the case where the operation content is an aspect ratio switch, and the resizing may be resizing when the operation content is digital zooming as long as the resizing process for the OB region is controlled in accordance with the operation content of the resizing request. Which operation content the resizing process is to be carried out on the OB region for may be determined in advance, or may be settable and changeable by the user. The processes following S901 are the same as those illustrated in FIG. 8.

According to the present embodiment as described thus far, the resizing process is carried out on the OB region in accordance with the details of the resizing request in the case where the resizing process will be carried out on the effective pixel region. Doing so makes it possible to suppress a drop in the correction quality during development involved in the resizing process while reducing the amount of processing involved in creating the RAW image data, reduce the data amount of the created RAW image data, and furthermore control the resizing process in accordance with the operation content.

Other Embodiments

The embodiments of the present invention describe examples in which the VOB region is in an upper area of the effective pixel region and the HOB region is in a left area of the effective pixel region. However, the present invention can be applied using the same configuration in the case where a VOB region is present at both the top and bottom of the effective pixel region and a HOB region is present at both the left and right of the effective pixel region. Furthermore, although the embodiments of the present invention describe examples of moving pictures, the same effects can be achieved by applying the present invention to still images as well.

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-096221 filed May 7, 2014, which is hereby incorporated by reference herein in its entirety.

What is claimed is:
1. An image capturing apparatus comprising:
   an image sensor in which pixels including pixels in a correction pixel region and an effective pixel region are arrayed two-dimensionally and which outputs uncompressed or losslessly-compressed effective pixel region image data acquired from the effective pixel region and uncompressed or losslessly-compressed correction pixel region image data acquired from the correction pixel region;
   a processor which resizes the effective pixel region image data; and
   a controller which controls the processor not to resize the correction pixel region image data in a case where the processor resizes the effective pixel region image data, and controls the processor to generate an image data of one frame by combining the resized effective pixel region image data with the non-resized correction pixel image data; and
   an output circuit which outputs the image data of one frame outside of the image capturing apparatus.

2. The apparatus according to claim 1, further comprising an image processor which corrects the effective pixel region image data using the correction pixel region image data.

3. The apparatus according to claim 1, wherein the processor resizes the effective pixel region image data by changing a size of the effect pixel region image data in a horizontal direction or changing a size of the effective pixel region image data in a vertical direction.

4. The apparatus according to claim 1, wherein the processor resizes the effective pixel region image data by switching an aspect ratio of the effective region image data, changing a zoom ratio, or changing an image extraction position.

5. The apparatus according to claim 1, wherein the effective pixel region image data and the correction pixel region image data are arranged in a single line.

6. The apparatus according to claim 1, wherein the effective pixel image data and the correction pixel region image data are arranged so that arranging all of one of the effective pixel region image data and the correction pixel region image data and then arranging all of the other of the image data.

7. A control method for an image capturing apparatus having an image sensor in which pixels including pixels in a correction pixel region and an effective pixel region are arrayed two-dimensionally and which outputs uncompressed or losslessly-compressed effective pixel region image data acquired from the effective pixel region and uncompressed or losslessly-compressed correction pixel region image data acquired from the correction pixel region, the control method comprising:
   resizing the effective pixel region image data,
   controlling resizing not to resize the correction pixel region image data in a case where the resizing resizes the effective pixel region image data, and controlling generation of an image data of one frame by combining the resized effective pixel region image data with the non-resized correction pixel region image data; and
   outputting the image data of one frame outside of the image capturing apparatus.

8. A non-transitory computer-readable storage medium storing a program causing a computer to perform a control method of an image capturing apparatus having an image sensor in which pixels including pixels in a correction pixel region and an effective pixel region are arrayed two-dimensionally and which outputs uncompressed or losslessly-compressed effective pixel region image data acquired from the effective pixel region and uncompressed or losslessly-compressed corrective pixel region image data acquired from the correction pixel region, the control method comprising:

resizing the effective pixel region image data, controlling resizing not to resize the correction pixel region image data in a case where the resizing resizes the effective pixel region image data, and controlling generation of an image data of one frame by combining the resized effective pixel region image data with the non-resized correction pixel region image data; and outputting the image data of one frame outside of the image capturing apparatus.

9. The apparatus according to claim 1, wherein the correction pixel region comprises an horizontal correction pixel region and a vertical correction pixel region, and the controller controls the processor not to resize the horizontal correction pixel region and the vertical correction pixel region in a case where the processor resizes the effective pixel region image data.

10. An image capturing apparatus comprising:

an image sensor in which pixels including pixels in a correction pixel region and an effective pixel region are arrayed two-dimensionally and which outputs uncompressed or losslessly-compressed effective pixel region image data acquired from the effective pixel region and uncompressed or losslessly-compressed correction pixel region image data acquired from the correction pixel region;

a processor which extracts a part of the effective pixel region image data;

a controller which controls the processor not to extract a part of the correction pixel region image data in a case where the processor extracts the part of the effective pixel region image data, and controls the processor to generate an image data of one frame by combining the extracted effective pixel region image data with the non-extracted correction pixel region image data; and an output circuit which outputs the image data of one frame outside of the image capturing apparatus.

11. The apparatus according to claim 10, further comprising an image processor which corrects the effective pixel region image data using the correction pixel region image data.

12. The apparatus according to claim 10, wherein the effective pixel region image data and the correction pixel region image data are arranged in a single line.

13. The apparatus according to claim 10, wherein the effective pixel region image data and the correction pixel region image data are arranged so that arranging all of one of the effective pixel region image data and the correction pixel region image data and then arranging all of the other of the image data.

14. A control method for an image capturing apparatus having an image sensor in which pixels including pixels in a correction pixel region and an effective pixel region are arrayed two-dimensionally and which outputs uncompressed or losslessly-compressed effective pixel region image data acquired from the effective pixel region and uncompressed or losslessly-compressed correction pixel region image data acquired froth the correction pixel region, the control method comprising:

extracting a part of the effective pixel region image data;

controlling extracting not to extract a part of the correction pixel region image data in a case where the processor extracts the part of the effective pixel region image data, and controlling generation of an image data of one frame by combining the extracted effective pixel region image data with the non-extracted correction pixel region image data; and outputting the image data of one frame outside of the image capturing apparatus.

15. A non-transitory computer-readable storage medium storing a program causing a computer to perform a control method of an image capturing apparatus having an image sensor in which pixels including pixels in a correction pixel region and an effective pixel region are arrayed two-dimensionally and which outputs uncompressed or losslessly-compressed effective pixel region image data acquired from the effective pixel region and uncompressed or losslessly-compressed corrective pixel region image data acquired from the correction pixel region, the control method comprising:

extracting a part of the effective pixel region image data;

controlling extracting not to extract a part of the correction pixel region image data in a case where the processor extracts the part of the effective pixel region image data, and controlling generation of an image data of one frame by combining the extracted effective pixel region image data with the non-extracted correction pixel region image data; and outputting the image data of one frame outside of the image capturing apparatus.

* * * * *